U S009921798B2

United States Patent
Manley et al.

(10) Patent No.: US 9,921,798 B2
(45) Date of Patent: Mar. 20, 2018

(54) UNIVERSAL SERIAL BUS-TO-BLUETOOTH AUDIO BRIDGING DEVICES

(71) Applicant: ClearOne Inc., Salt Lake City, UT (US)

(72) Inventors: Peter H. Manley, Draper, UT (US); Balasubramaniyan Krishnamoorthy, Salt Lake City, UT (US); Derek Graham, South Jordan, UT (US)

(73) Assignee: ClearOne, Inc., Salt Lake City, UT (US)

( * ) Notice: Subject to any disclaimer, the term of this patent is extended or adjusted under 35 U.S.C. 154(b) by 261 days.

(21) Appl. No.: 14/561,700

(22) Filed: Dec. 5, 2014

(65) Prior Publication Data

US 2015/0199169 A1   Jul. 16, 2015

Related U.S. Application Data

(60) Provisional application No. 61/912,063, filed on Dec. 5, 2013.

(51) Int. Cl.
*G06F 13/42* (2006.01)
*G06F 3/16* (2006.01)
(Continued)

(52) U.S. Cl.
CPC .............. *G06F 3/162* (2013.01); *G06F 3/165* (2013.01); *G06F 13/387* (2013.01);
(Continued)

(58) Field of Classification Search
None
See application file for complete search history.

(56) References Cited

U.S. PATENT DOCUMENTS 8,121,547 B2    2/2012   Findlay et al.
8,233,930 B1 *  7/2012   Dawson .............. H04L 12/1818
                                                        370/260
(Continued)

OTHER PUBLICATIONS

Clearone®, "Audio and Video Solutions Guide: Great Ideas Need to be Heard", 2011, 112 pages.
(Continued)

*Primary Examiner* — Ilwoo Park
*Assistant Examiner* — Aurangzeb Hassan
(74) *Attorney, Agent, or Firm* — Matthew J. Booth PC; Matthew J. Booth

(57) ABSTRACT

This disclosure describes a system (100, 130) for a USB to Bluetooth audio bridging method and apparatus. The system includes a host device (102) having a first universal serial bus (USB) interface (107) and a second USB interface (110); an adaptor (108) in connection with the first USB interface (107) which is compatible to operate based on a Bluetooth-type communication protocol; a peripheral device (106) coupled to the second USB interface (110); and a mobile communication device (104) linked to the host device (102) via the adaptor (108). The mobile communication device (104) communicates an audio data signal to the adaptor (108) and an audio bridging device (116). The audio bridging device (116) maps the second USB interface (110) to the adaptor (108) and routes audio data signals alone or in combination with another audio data signals to the peripheral device (106) via the second USB interface (110).

20 Claims, 6 Drawing Sheets

(51) Int. Cl.
   *G06F 13/38* (2006.01)
   *H04R 27/00* (2006.01)
   *G06F 13/40* (2006.01)

(52) U.S. Cl.
   CPC ......... *G06F 13/4286* (2013.01); *H04R 27/00* (2013.01); *G06F 13/385* (2013.01); *G06F 13/4072* (2013.01); *G06F 13/4295* (2013.01); *H04B 2201/71346* (2013.01); *H04R 2227/003* (2013.01)

(56) References Cited

U.S. PATENT DOCUMENTS

| | | | |
|---|---|---|---|
| 8,326,338 B1 | 12/2012 | Vasilevsky | |
| 8,363,844 B2 | 1/2013 | Winter | |
| 2003/0021423 A1* | 1/2003 | Wood | H04S 1/002 381/18 |
| 2005/0037807 A1 | 2/2005 | Dove | |
| 2006/0103721 A1 | 5/2006 | Shih et al. | |
| 2006/0193301 A1* | 8/2006 | Cheng | H04M 1/2535 370/338 |
| 2009/0100178 A1* | 4/2009 | Gonzales | G06F 9/50 709/226 |
| 2012/0172004 A1* | 7/2012 | Silva | H04L 12/1831 455/412.1 |
| 2012/0188999 A1 | 7/2012 | Quinn et al. | |
| 2013/0097244 A1* | 4/2013 | Manley | H04L 51/18 709/204 |
| 2013/0183901 A1* | 7/2013 | Joergensen | H04M 1/57 455/41.2 |
| 2014/0122588 A1* | 5/2014 | Nimri | H04L 12/1831 709/204 |

OTHER PUBLICATIONS

Tom's Hardware, "Audio Conferencing Using Bluetooth Enabled Mobile", Document Available at <http://www.tomshardware.com/forum/50952-36-audio-conferencing-bluetooth-enabled-mobile> Retreived on Oct. 18, 2013, 3 pages.

Ploycom Inc, "Ploycom® : User Guide", VoiceStation™ 500, 2005, 24 pages.

Konftel, "The Konftel 55W User Guide", Available at <http://www.konftel.com/Global/PDF/User_guide/Konftel_55W/Konftel55W-UG_ENG.pdf>, Retreived on Oct. 18, 2013, 41 pages.

* cited by examiner

UNIVERSAL SERIAL BUS-TO-BLUETOOTH AUDIO BRIDGING DEVICES

CROSS REFERENCE TO RELATED APPLICATIONS

This application claims priority and the benefits of the earlier filed Provisional U.S. Ser. No. 61/912,063, filed 5 Dec. 2013, which is incorporated by reference for all purposes into this specification.

TECHNICAL FIELD

This disclosure relates to audio conferencing systems. More specifically, this disclosure relates to a Universal Serial Bus-to-Bluetooth (U2B) audio bridging device.

BACKGROUND ART

Audio conferencing solutions facilitate communication between more than two users located at remote locations using an audio conferencing endpoint (AC endpoint) such as a speakerphone. At each location, the AC endpoint may be connected to terminal equipment (e.g., a mobile phone, a landline handset, a speaker, a microphone, etc.) via any of the physical interfaces, for example, a Universal Serial Bus (USB), a Small Computer System Interface (SCSI), an IEEE 1394 bus, optical fiber, etc. to provide or extend conferencing capabilities.

In order to wirelessly connect with the terminal equipment, state-of-the-art AC endpoints are made compatible with various wireless communication technologies, for example, IEEE 802.11b (Wi-Fi), IEEE 802.11a, Bluetooth, HomeRF, ZigBee, etc. implemented on the terminal equipment. This increases the manufacturing as well as maintenance cost of the AC endpoint due to a continual requirement for hardware and/or software upgrade to remain compatible with the wireless communication technology implemented on the terminal equipment.

Therefore, there exists a need for an alternative system that enables local connection between the terminal equipment and the AC endpoint while the AC endpoint being independent of the wireless communication technology implemented on the terminal equipment.

SUMMARY OF INVENTION

This disclosure describes a USB-to-Bluetooth audio bridging device. The present disclosure enables local connection between the terminal equipment and the AC endpoint while the AC endpoint is independent of the wireless communication technology implemented on the terminal equipment.

One embodiment of the present disclosure provides a system comprising a host device, an adaptor, a peripheral device, a mobile communication device, and an audio bridging device. The host device includes a first universal serial bus (USB) interface and a second USB interface, wherein said host device is configured to execute a first software application generating a first audio data signal via a virtual audio device. The adaptor is coupled to said first USB interface, wherein said adaptor is compatible to operate based on a Bluetooth-type communication protocol. The peripheral device is coupled to said second USB interface. The mobile communication device is linked to said host device via said adaptor, wherein said mobile communication device is configured to communicate a second audio data signal to said adaptor over a wireless network. The audio bridging device is in communication with said host device, wherein said audio bridging device is configured to map said second USB interface to at least one of said adaptor and said virtual audio device, wherein said audio bridging device is configured to route at least one of said first audio data signal, said second audio data signal, and a combination thereof to said peripheral device via said second USB interface.

Other and further aspects and features of the disclosure will be evident from reading the following detailed description of the embodiments, which are intended to illustrate, not limit, the present disclosure.

BRIEF DESCRIPTION OF DRAWINGS

To further aid in understanding the disclosure, the attached drawings help illustrate specific features of the disclosure and the following is a brief description of the attached drawings.

DISCLOSURE OF EMBODIMENTS

Figure 1A:
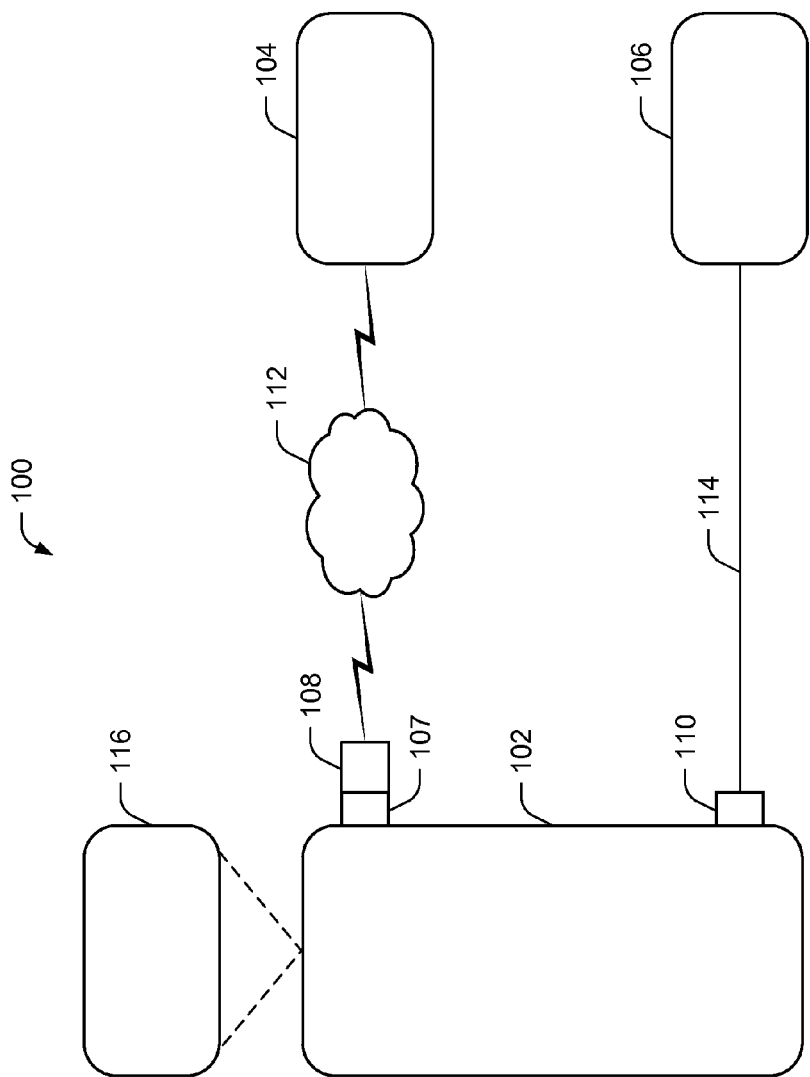
FIG. 1A illustrates a first network environment for implementing an exemplary USB-to-Bluetooth (U2B) audio bridging device.

This disclosure describes a USB-to-Bluetooth (U2B) audio bridging device. The disclosed embodiments are intended to describe aspects of the disclosure in sufficient detail to enable those skilled in the art to practice the invention. Other embodiments may be utilized and changes may be made without departing from the scope of the disclosure. The following detailed description is not to be taken in a limiting sense, and the scope of the present invention is defined only by the included claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative functional units includes logical blocks, modules, and circuits described in connection with the embodiments disclosed herein so as to more particularly emphasize their implementation independence. The functional units may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, any conventional processor, controller, microcontroller, or state machine. A general purpose processor may be considered a special purpose processor while the general purpose processor is configured to fetch and execute instructions (e.g., software code) stored on a computer readable medium such as any type of memory, storage, and/or storage devices. A processor may also be implemented as a combination of computing devices, such as a combination of a DSP and a microprocessor, a plurality of microprocessors, one or more microprocessors in conjunction with a DSP core, or any other such configuration.

In addition, the various illustrative functional units previously described above may include software or programs such as computer readable instructions that may be described in terms of a process that may be depicted as a flowchart, a flow diagram, a structure diagram, or a block diagram. The process may describe operational acts as a sequential process, many of these acts can be performed in another sequence, in parallel, or substantially concurrently. Further, the order of the acts may be rearranged. In addition, the software may comprise one or more objects, agents, threads, lines of code, subroutines, separate software applications, two or more lines of code or other suitable software structures operating in one or more software applications or on one or more processors. The software may be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Figure 3:
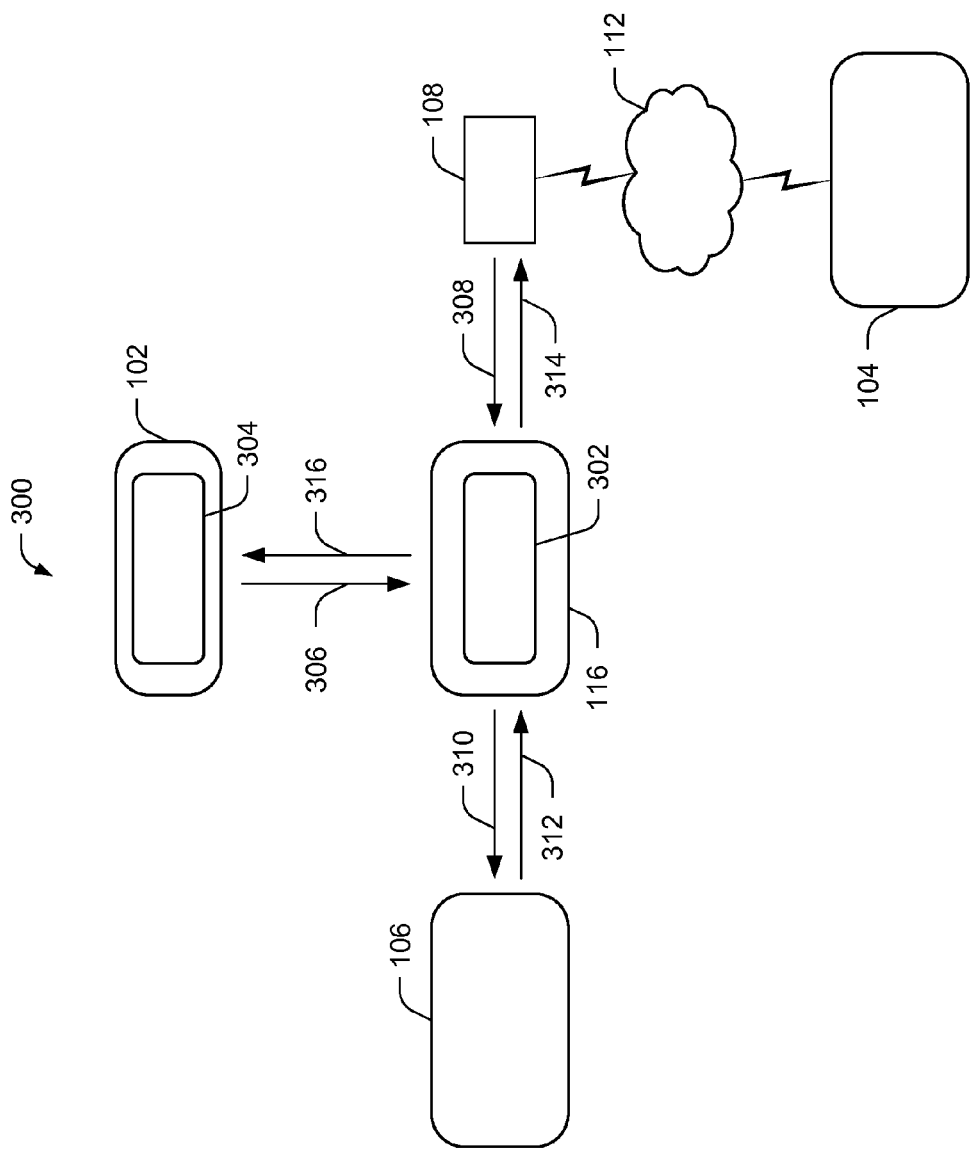
FIG. 3 illustrates an exemplary audio routing and mixing topology being implemented using the U2B audio bridging device.

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. For example, where feasible elements in FIG. 3 are designated with a format of 3xx, where 3 indicates FIG. 3 and xx designates the unique element.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second element does not mean that only two elements may be employed or that the first element must precede the second element in some manner. In addition, unless stated otherwise, a set of elements may comprise one or more elements.

Reference throughout this specification to "one embodiment", "an embodiment" or similar language means that a particular feature, structure, or characteristic described in connection with the embodiment is included in at least one embodiment of the present invention. Thus, appearances of the phrases "one embodiment", "an embodiment" and similar language throughout this specification may, but do not necessarily, all refer to the same embodiment.

Non-Limiting Definitions

In various embodiments of the present disclosure, definitions of one or more terms that will be used in the document are provided below.

A "host device" is used in the present disclosure in the context of its broadest definition. The host device may refer to a networked computing device configured to at least one of (1) store, manage, or process audio, video, or alphanumeric data or documents, (2) establish a communication channel or environment, and (3) request services from or deliver services to, or both, other devices connected to the network. Various examples of the host device include, but not limited to, a desktop PC, a personal digital assistant (PDA), a server, a mainframe computer, a mobile computing device (for example, laptops, smartphone), etc. In addition, the host device may include one or more network interfaces typically found in networked computing devices that support one more network protocols.

An "endpoint" is used in the present disclosure in the context of its broadest definition. The endpoint may refer to one or more computing devices capable of establishing a communication channel for exchange of at least audio data in a communication session. Examples of the computing devices may include, but are not limited to, a desktop PC, a personal digital assistant (PDA), a server, a mainframe computer, a mobile computing device (for example, mobile phones, laptops, tablets, etc.), calling devices (for e.g., a telephone, a speakerphone, an internet phone, a video telephone, etc.).

A "mobile communication device" is used in the present disclosure in the context of its broadest definition. The mobile communication device may refer to any of a variety of portable computing devices including a mobile phone, a tablet, a laptop, and so on, configured for or capable of providing audio signals.

The numerous references in the disclosure to the U2B audio bridging device are intended to cover any and/or all devices capable of performing respective operations on the endpoints in a conferencing environment relevant to the applicable context, regardless of whether or not the same are specifically provided.

Detailed Description of the Invention follows.

FIG. 1A illustrates a first network environment 100 for implementing an exemplary U2B audio bridging device according to an embodiment of the present disclosure. Embodiments are disclosed in the context of environments that represent an audio conference among multiple users via one or more endpoints such as audio conference endpoints (AC endpoints) capable of receiving audio signals either directly from users or from coupled audio sources, such as a mobile communication device and a unified communications (UC) application. However some embodiments may be applied in the context of other scenarios (for example, a video conference) involving audio signals being communicated to the AC endpoint. In some embodiments, the AC endpoint may execute a software application such as a UC application during a conference session.

The first network environment 100 may include a host device 102, a mobile communication device 104 (e.g., a mobile phone), and an AC endpoint 106. The host device 102 may include one or more of a variety of interfaces known in the art, related art, or developed later including a PC Card slot, a Peripheral Component Interconnect (PCI), an Advanced Graphic Port (AGP) for being coupled to or communicate with one or more external devices. In one example, the host device 102 may include a first Universal Serial Bus (USB) port 107 and a second USB port 110.

In one embodiment, the first USB port 107 may be coupled to an adaptor 108, which may be configured to communicate with the mobile communication device 104 over a network 112 based on a predetermined communication protocol. In one example, the adaptor 108 may be a Bluetooth adaptor configured to communicate with the mobile communication device 104 such as a mobile phone based on a Bluetooth communication protocol over the network 112. The network 112 may include, for example, Wide Area Networks (WANs), Local Area Networks (LANs), Personal Area Networks (PANs), radio, television, and/or any other delivery or tunneling mechanism for carrying data such as audio data. The network 112 may comprise multiple networks or sub-networks, each of which may comprise, for example, a wireless data pathway. The network 112 may comprise a circuit-switched voice network, a packet-switched data network, or any other network that is able to carry electronic communications. For example, the network 112 may comprise networks based on short range wireless communication protocols including, but not limited to, Bluetooth, ZigBee, Wi-Fi, ANT+, and Z-Wave. The network 112 may support voice using these protocols and other comparable protocols for voice data communications.

In some embodiments, the adaptor 108 may communicate with the mobile communication device 104 through a Bluetooth-type audio communication channel, or in other words, a short range wireless communication channel, being established based on a variety of corresponding Bluetooth-type communication standards known in the art, related art, or developed later including Bluetooth, Wi-Fi, ZigBee, and Z-Wave. In one example, the connection between the adaptor 108 and the mobile communication device 104 may be managed using a dedicated Bluetooth profile such as the hands free profile (HFP), the headset profile (HSP), or the advanced audio distribution profile (A2DP), which may be defined by the Bluetooth communication protocol for allowing encoding and transmission of audio data between the mobile communication device 104 and the adaptor 108. In one example, the mobile communication device 104 may pair or connect with the adaptor 108 in the headset profile for communicating audio data as an audio peripheral such as a headset. In the headset profile, the mobile communication device 104 may be configured to receive audio data signals via the adaptor 108.

In another embodiment, the host device 102 may be associated with various devices which may include, but are not limited to, a camera, display device, microphone, speakers, and one or more codecs, or any other type of conferencing hardware, or in any combination thereof through the interfaces such as the second USB port 110. In another embodiment, the host device 102 may comprise video, voice and data communication capabilities (for example, video-conferencing capabilities) by being coupled to or including, various audio devices (for example, microphones, audio input devices, speakers, audio output devices, telephones, speaker telephones, etc.), various video devices (for example, monitors, projectors, displays, televisions, video output devices, video input devices, cameras, etc.), various networks (IP, PSTN, etc.) or any combination thereof.

In a further embodiment, the host device 102 may be configured to host and/or execute software applications. In one example, the software applications may include, but not limited to, unified communications (UC) applications such as Microsoft Lync, Skype, IBM SameTime, and Cisco IP Communicator. Each of the UC applications may operate with same or different communication protocols and media formats. In some embodiments, the UC applications may generate audio data signals via a virtual audio device, e.g., a virtual sound card (not shown), being in communication with the host device 102, discussed later in greater detail.

Furthermore, the host device 102 may be coupled to the AC endpoint 106 via the second interface such as the second USB port 110 using a compatible transmission media such as a USB cable 114. The AC endpoint 106 may be removably connected to the host device 102 as a peripheral device. The AC endpoint 106 may be configured to at least one of (1) receive audio data signals from one or more sources such as the host device 102 via the second USB port 110, or directly from a user; (2) establish a communication channel with other locally or remotely located devices or endpoints such as AC endpoints over a network such as the Internet, analog or digital wired and wireless telephone networks (e.g., a PSTN, Integrated Services Digital Network (ISDN), a cellular network, and Digital Subscriber Line (xDSL)), satellite, and/or any other delivery or tunneling mechanism to send or receive audio data signals; and (3) store data from the received audio data signals.

In one embodiment, the host device 102 may be installed, integrated, or operate in communication with a U2B audio bridging device 116 (hereinafter referred to as bridging device 116) configured to, at least one of: (1) create a logical representation of one or more networked devices such as the mobile communication device 104 in communication with the host device 102; (2) establish a local communication bridge or channel among the mobile communication device 104, the AC endpoint 106, and one or more software applications such as UC applications being executed by the host device 102; (3) store, manage, and process the audio data signals received from the AC endpoint 106, the UC applications, and the mobile communication device 104 connected to the network 112; (4) request services from or deliver services to, or both, various devices connected to a network such as the network 112; and (5) combine audio data signals from two or more audio sources such as the mobile communication device 104 (via the adaptor 108), one or more UC applications (via a virtual audio device), and the peripheral device such as the AC endpoint 106 (via the second USB port 110) to combine and create a composite audio data signal using an audio mixing methodology.

In one embodiment, the audio bridging device 116 could be designed to appropriately mix the various audio data signals, using a mix-minus methodology, so that all conference participants can hear each other but not themselves.

The bridging device 116 may facilitate integration of real-time and non-real-time communication services by establishing an audio bridge or communication channel among the mobile communication device 104, the AC endpoint 106, and one or more UC applications being simultaneously executed on the host device 102. Examples of such real-time services may comprise, but are not limited to, instant voice messaging, audio conferencing, call control, and speech recognition. Examples of the non-real-time services may comprise, but are not limited to, voicemail and audio short messaging service (audio SMS).

In some embodiments, the bridging device 116 may be implemented as a standalone and dedicated device including hardware and installed software, where the hardware is closely matched to the requirements and/or functionality of the software. Alternatively, the bridging device 116 may be implemented as a software application or a device driver. The bridging device 116 may enhance or increase the functionality and/or capacity of the network 112 to which it is connected.

In some other embodiments, the bridging device 116 may be configured to expose its computing environment or operating code to the user, and may comprise related art I/O devices, such as a microphone, a speaker, a scanner, a keyboard, or a display. The bridging device 116 may, however, comprise software, firmware or other resources that support remote administration and/or maintenance of the bridging device 116.

In yet another embodiment, the bridging device 116 may comprise at least one processor (not shown) executing machine readable program instructions for performing various operations, such as those discussed above, on the received audio data signals. The bridging device 116 may comprise, in whole or in part, a software application such as a conference application (discussed below in greater detail) working alone or in conjunction with one or more hardware resources such as the host device 102. Such software applications may be executed by the processor on different hardware platforms or emulated in a virtual environment. Aspects of the bridging device 116 may leverage known, related art, or later developed off-the-shelf software.

Figure 1B:
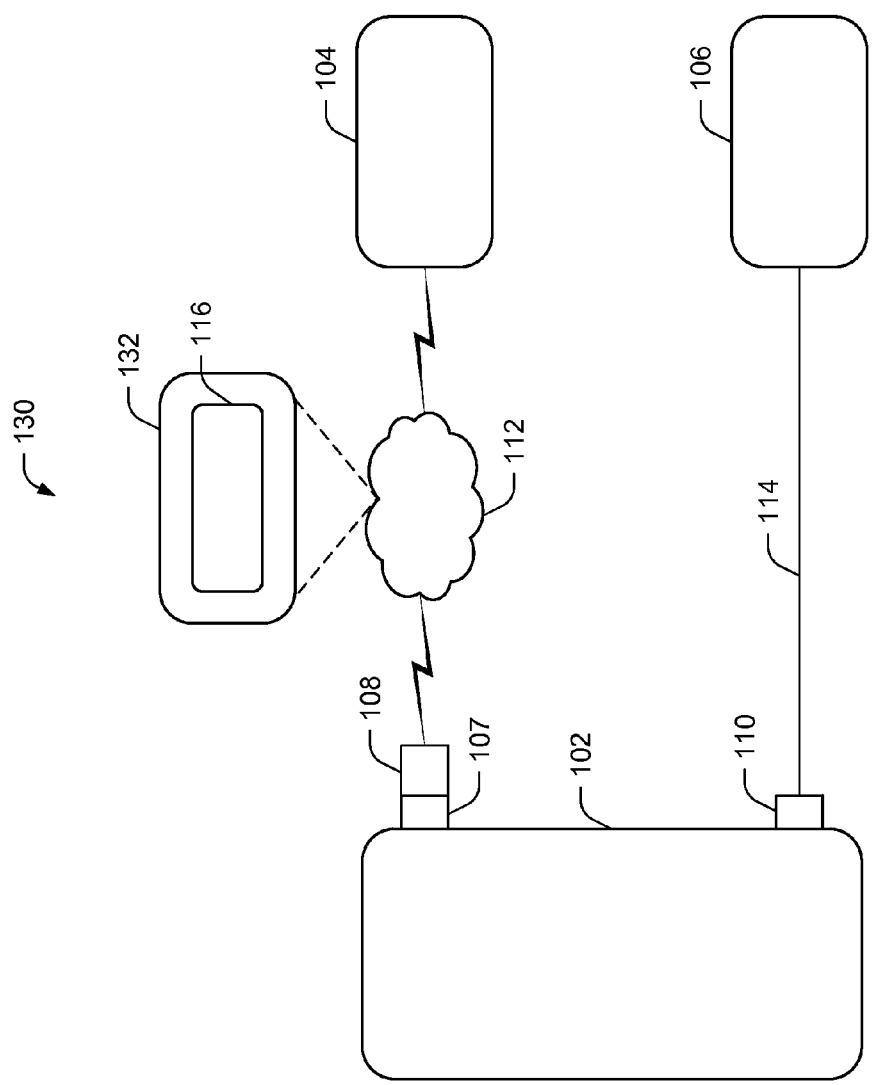
FIG. 1B illustrates a second network environment for implementing the U2B audio bridging device.
Figure 1C:
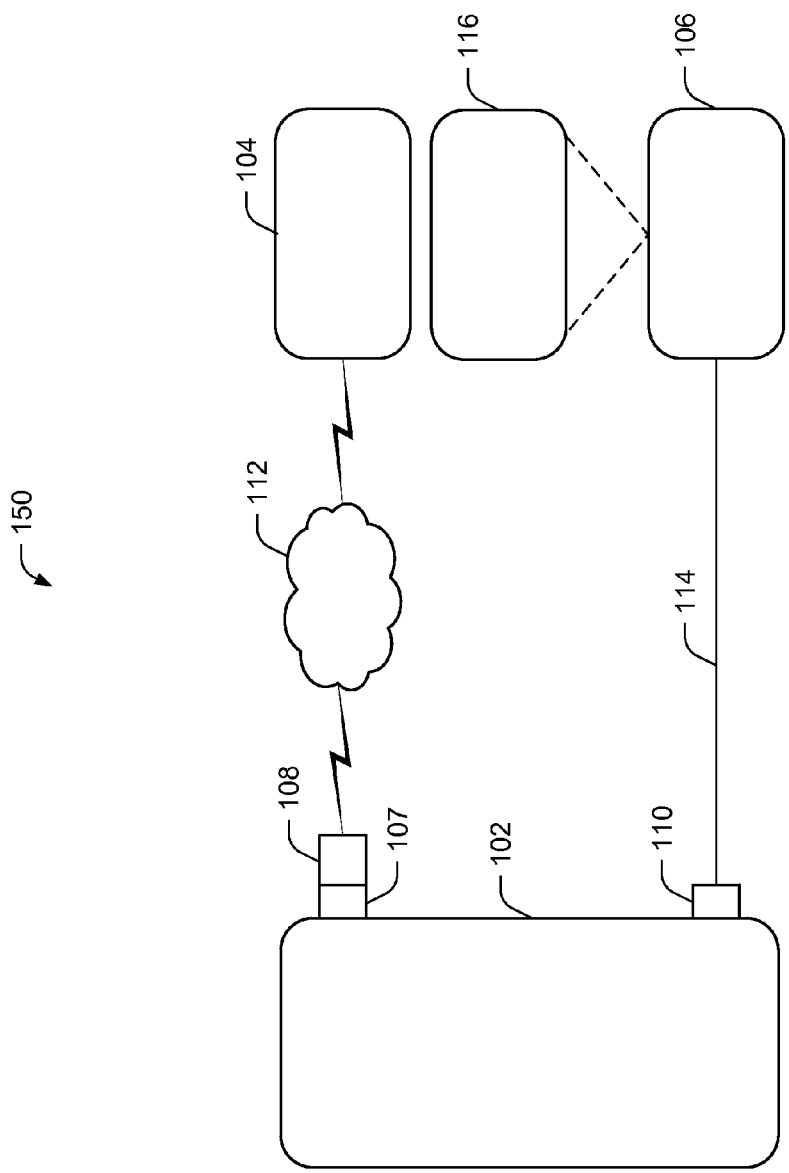
FIG. 1C illustrates a third network environment for implementing the U2B audio bridging device.
Figure 1D:
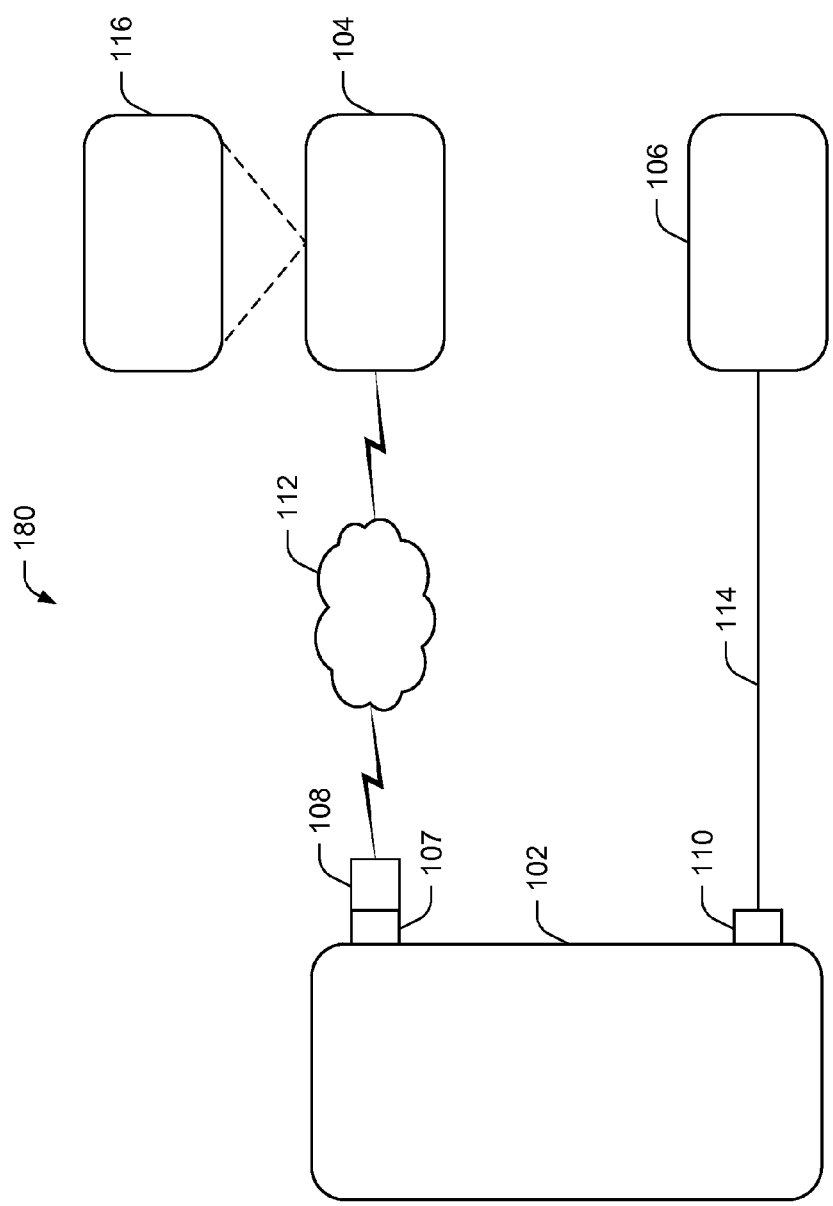
FIG. 1D illustrates a fourth network environment for implementing the U2B audio bridging device.

Further, embodiments of the second network environment 130 (FIG. 1B) may include the bridging device 116 being integrated with, or installed on, a network appliance 132 that is associated with or used to establish the network 112. The network appliance 132 may be capable of operating as an interface device to assist exchange of program instructions and audio data between the bridging device 116 and the mobile communication device 104 via the adaptor 108. In some embodiments, the network appliance 132 may be preconfigured or dynamically configured to include the bridging device 116 integrated with other devices. For example, the bridging device 116 may be integrated with the AC endpoint 106, as shown in a third network environment 150 of FIG. 1C, or any other device, such as the mobile communication device 104, as shown in a fourth network environment 180 of FIG. 1D, connected to the network 112. The bridging device 116 may include a module (not shown), which may introduce the bridging device 116 to the network appliance 132, thereby enabling the network appliance 132 to invoke the bridging device 116 as a service. Examples of the network appliance 132 may comprise, but are not limited to, a DSL modem, a wireless access point, a router, and a gateway having a predetermined computing power sufficient for implementing the bridging device 116.

Figure 2:
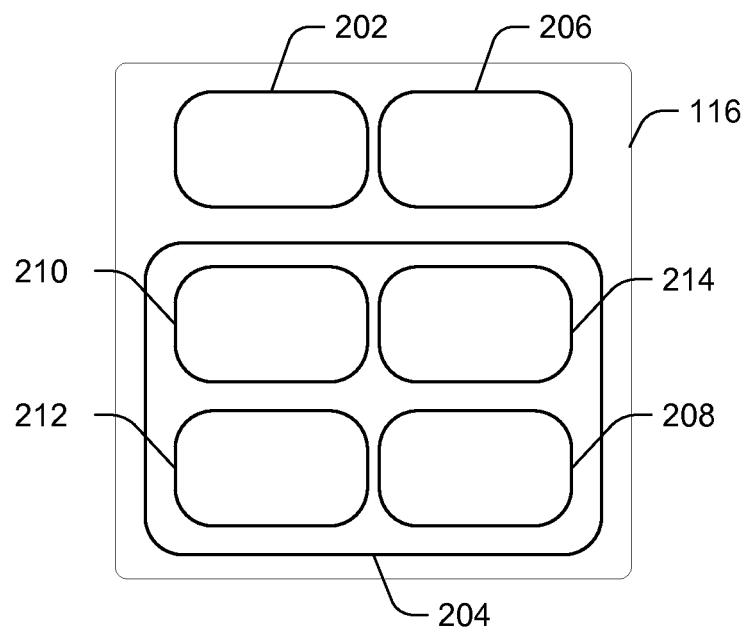
FIG. 2 illustrates the U2B audio bridging device.

FIG. 2 illustrates the U2B audio bridging device of FIG. 1A according to an embodiment of the present disclosure. The bridging device 116 may be implemented in a single device, as illustrated, or may be distributed across multiple devices. The bridging device 116 may be implemented in hardware or a suitable combination of hardware and software, and may comprise one or more software systems operating on a digital signal processing platform. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processor(s) 202. The processor(s) 202 may include, for example, microprocessors, microcomputers, microcontrollers, digital signal processors, central processing units, state machines, logic circuits, and/or any devices that manipulate signals based on operational instructions. Among other capabilities, the processor(s) 202 may be configured to fetch and execute computer readable instructions in a memory such as a system memory 204 associated with the bridging device 116 for performing tasks such as signal transcoding, input/output data processing, power control, and/or other functions.

Embodiments may include the bridging device 116 operating as or in an Internet access node, application server, IMS core, service node, or some other communication device or system, including any combination thereof. In some embodiments, the bridging device 116 may comprise or implement one or more real time protocols, for e.g., session initiation protocol (SIP), H.261, H.263, H.264, H.323, among others. In some other embodiments, the bridging device 116 may be integrated with or implemented as a set of instructions in a portable storage device; a wearable device such as a fashion accessory (e.g., a wrist band, a ring, etc.) and a body clothing; a utility device (a hand-held baton, a pen, an umbrella, a watch, etc.); or any combination thereof.

The bridging device 116 may include a variety of known, related art, or later developed interface(s) 206, including software interfaces (e.g., an application programming interface, a graphical user interface, etc.); hardware interfaces (e.g., cable connectors, the keyboard, an interactive display screen, etc.); or both. In one embodiment, the bridging device 116 may be in communication or integrated with the adaptor 108 interfacing with the mobile communication device 104.

The bridging device 116 may further include the system memory 204 for storing at least one of (1) audio or video data, associated metadata (e.g., data size, data format, creation date, communication protocol through which the audio data signal may be communicated, associated tags or labels, related messages, etc.), and related files; (2) an interface device type, (3) a log of profiles of network devices and associated communications including instructions, queries, conversations, data, and related metadata; and (4) logical representations of the network devices.

The system memory 204 may comprise of any computer-readable medium known in the art, related art, or developed later including, for example, a processor or multiple processors operatively connected together, volatile memory (e.g., RAM), non-volatile memory (e.g., flash, etc.), disk drive, etc., or any combination thereof. The system memory 204 may include one or more databases such as a database 208, which may be sub-divided into further databases for storing electronic files and data such as audio or video data. The system memory 204 may have one of many database schemas known in the art, related art, or developed later for storing data from the host device 102, the mobile communication device 104, or the AC endpoint 106 via the bridging device 116. For example, the database 208 may have a relational database schema involving a primary key attribute and one or more secondary attributes. In some embodiments, the bridging device 116 may perform one or more operations, but not limited to, reading, writing, indexing, labeling, updating, and modifying the data, and may communicate with various networked devices.

In one embodiment, the system memory 204 may include various modules such as an input module 210, a multipoint control unit (MCU) 212, and an output module 214. The input module 210 may be configured to receive audio data signals in various real-time or non-real time communication protocols. For e.g., the input module 210 may receive a first set of audio data signals as Bluetooth signals (hereinafter referred to as BT signals) via the adaptor 108 from the mobile communication device 104 over the network 112; a second set of audio data signals (hereinafter referred to as USB signals) via the USB port 110 from the AC endpoint 106; and a third set of audio data signals (hereinafter referred to as UC signals) from a UC application being executed by the host device 102 via the virtual audio device, e.g., a virtual sound card. Any of these received audio data signals may be encoded using a variety of encoding algorithms known in the art, related art, or developed later. The input module 210 may decode these encoded BT signals, the USB signals, and the UC signals and send them to the MCU 212 for further processing. In some embodiments, the input module 210 may convert the BT signals, the USB signals, and the UC signals into corresponding data packets, namely, BT packets, USB packets, and UC packets in accordance with, for example, the TCP/IP Specification and H.323 Specification.

The MCU 212 may receive the BT signals, the USB signals, and the UC signals from the input module 210. The MCU 212 may be configured to implement various real-time and non-real time communication protocols for rendering and/or transmitting the BT signals, the USB signals, and the UC signals received from the input module 210. The MCU 212 may be further configured to determine various characteristics of the connected physical or virtual devices such as the AC endpoint 106, the mobile communication device 104, and the virtual audio device for handling the respective received signals. The characteristics may include, but are not limited to, type (for example, a mobile phone, a speakerphone, etc.) of the connected device, supported audio bit rate, supported codecs, network connection speed, and so on.

In one embodiment, the MCU 212 may be configured to map the second USB port 110 to the adaptor 108, via the first USB port 107, e.g., upon determining the attached devices being active, to create an audio bridge or communication channel between the second USB port 110 and the adaptor 108 for audio data communication. For example, the MCU 212 may map the second USB port 110 to the adaptor 108 upon determining that the mobile communication device 104 is paired with the adaptor 108 over the network 112 and the AC endpoint 106 being physically connected to the second USB port 110. In another embodiment, the MCU 212 may map the second USB port 110 to the virtual audio device in a similar manner upon determining the second USB port 110 and the virtual audio device being active to create an audio bridge for audio data communication. In yet another embodiment, the MCU 212 may be configured to combine audio data signals from multiple devices such as at least two of the mobile communication device 104, the AC endpoint 106, and the UC application to create a composite audio data signal for transmission to at least one of the remaining coupled devices. For example, the MCU 212 may combine the BT signals and the UC signals to create a composite audio data signal for transmission to the AC endpoint 106 via the second USB port 110, discussed below in greater detail. The MCU 212 may transmit the received audio data signals, and/or at least one composite audio data signal, in some embodiments, to the output module 214 for being transmitted to the mapped destinations over the created local audio bridge using the bridging device 116.

The output module 214 may be configured to convert the audio data signals received from the MCU 212 into an appropriate format that may be compatible with one or more mapped destinations. For example, the output module 214 may convert the USB signals into Bluetooth compatible signals for being communicated to the mobile communication device 104 via the adaptor 108, and vice versa. Similarly, the output module 214 may convert the USB signals into an appropriate format for being played by the virtual audio device in communication with the UC application executed by the host device 102, and vice versa. In some embodiments, the output module 214 may store audio data corresponding to the BT signals, the USB signals, or the UC signal into the database 208.

FIG. 3 illustrates an exemplary audio mixing topology being implemented using the U2B audio bridging device of FIG. 1A according to an embodiment of the present disclosure. The audio mixing topology 300 may include a software application configured to operate as a conference application 302 being executed on the host device 102 or the bridging device 116 to control or manage the bridging device 116. The conference application 302 may dynamically control various attributes of the bridging device 116 including activation and deactivation of the bridging device 116. Other examples of these attributes may include, but not limited to, on-the-fly mapping of two or more interface devices such as the adaptor 108 and the second USB port 110 to each other, dynamic selection of communication protocols and output formats of the audio data signals for transmission, and customized selection of input audio sources and compatible destination devices.

In one embodiment, the conference application 302 may communicate with the adaptor 108, the AC endpoint 106, and the virtual audio device via a UC application such as a UC application 304 being executed by the host device 102 for mapping the second USB port 110, which is in communication with the AC endpoint 106, to the adaptor 108 and the virtual audio device for communication of audio data signals from these devices.

In a first example, the conference application 302 may be preconfigured or dynamically configured, e.g., by a user, to operate the bridging device 116 for combining the UC signals, UCin 306, received as input from the UC application 304 and the BT signals, BTin 308, received as input from the adaptor 108 to generate a composite audio data output signal such as an AC output signal, ACout 310, which may be communicated to the AC endpoint 106 via the USB port 110 by the bridging device 116 as shown in Equation 1.

$$ACout=\Sigma(UCin+BTin) \quad (1)$$

In a second example, the conference application 302 may be preconfigured or dynamically configured, e.g., by a user, to operate the bridging device 116 for combining the UC signals, UCin 306, received as input from the UC application 304 and the USB signals, USBin 312, received as input from the AC endpoint 106 via the second USB port 110 to generate a composite audio data output signal such as a BT output signal, BTout 314, which may be communicated to the mobile communication device 104 via the adaptor 108 by the bridging device 116 as shown in Equation 2.

$$BTout=\Sigma(UCin+ACin) \quad (2)$$

In a third example, the conference application 302 may be preconfigured or dynamically configured, e.g., by a user, to operate the bridging device 116 for combining the BT signals, BTin 308, received as input from the mobile communication device 104 via the adaptor 108 and the USB signals, USBin 312, received as input from the AC endpoint 106 via the second USB port 110 to generate a composite audio data output signal such as a UC output signal, UCout 316, which may be communicated to the virtual audio device via the UC application 304 by the bridging device 116 as shown in Equation 3.

$$UCout=\Sigma(USBin+ACin) \quad (3)$$

Similar to the output signals ACout 310, BTout 314, and UCout 316 as shown above, the conference application 302 or client may be configured to route and mix two or more received input audio signals to the mapped destinations using the bridging device 116.

To summarize, this disclosure describes a USB-to-Bluetooth audio bridging device. The present disclosure enables local connection between the terminal equipment and the AC endpoint while the AC endpoint is independent of the wireless communication technology implemented on the terminal equipment.

One embodiment of the present disclosure provides a system comprising a host device 102, an adaptor 108, a peripheral device, a mobile communication device 104, and an audio bridging device 116. The host device 102 includes a first universal serial bus (USB) interface and a second USB interface, wherein said host device 102 is configured to execute a first software application generating a first audio data signal via a virtual audio device. The adaptor 108 is coupled to said first USB interface, wherein said adaptor 108 is compatible to operate based on a Bluetooth-type communication protocol. The peripheral device is coupled to said second USB interface. The mobile communication device 104 is linked to said host device 102 via said adaptor 108, wherein said mobile communication device 104 is configured to communicate a second audio data signal to said adaptor 108 over a wireless network. The audio bridging device 116 is in communication with said host device 102, wherein said audio bridging device 116 is configured to map said second USB interface to at least one of said adaptor 108 and said virtual audio device, wherein said audio bridging device 116 is configured to route at least one of said first audio data signal, said second audio data signal, and a combination thereof to said peripheral device via said second USB interface.

Other embodiments of the present invention will be apparent to those ordinarily skilled in the art after considering this disclosure or practicing the disclosed invention. The specification and examples above are exemplary only, with the true scope of the present invention being determined by the following claims.

The invention claimed is:

1. A system for USB to Bluetooth audio bridging that routes and mixes audio data signals between different devices, comprising:
    a host device comprising a first universal serial bus (USB) interface and a second USB interface;
    an adaptor coupled to the first USB interface, where the adaptor is compatible to operate based on a Bluetooth-type communication protocol;
    a mobile communication device linked to the host device via the adaptor, the mobile communication device is configured to communicate a first audio data signal to the adaptor over a wireless network;
    an audio conferencing peripheral device linked to the host device via the second USB interface, the audio conferencing peripheral device is configured to communicate a second audio data signal;
    an audio bridging device in communication with the host device, where the audio bridging device is configured to route the first audio data signal and the second audio data signal between the mobile communication device and the audio conferencing peripheral device, the audio bridging device combines and mixes the audio data signals to create a composite audio data signal using an audio mixing methodology; and
    where the host device executing a unified communications (UC) application that generates a third audio data signal via a virtual audio device, the audio bridging device routes and mixes the third audio data signal with the first and second audio data signal between the mobile communication device, the audio conferencing peripheral device, and the UC application.

2. The claim according to claim 1, where the adaptor is a Bluetooth dongle.

3. The claim according to claim 1, where the adaptor is integrated with the host device.

4. The claim according to claim 1, wherein the audio bridging device is dynamically operated by a software application in communication with the adaptor and the second USB interface.

5. A method to use a system for USB-to-Bluetooth audio bridging that routes and mixes audio data signals between different devices, comprising:
    providing a host device comprising a first universal serial bus (USB) interface and a second USB interface;
    providing an adaptor to the first USB interface, where the adaptor is compatible to operate based on a Bluetooth-type communication protocol;
    linking a mobile communication device to the host device via the adaptor, the mobile communication device is configured to communicate a first audio data signal to the adaptor over a wireless network;
    linking an audio conferencing peripheral device to the host device via the second USB interface, the audio conferencing peripheral device is configured to communicate a second audio data signal;
    configuring audio bridging device to route the first audio data signal and the second audio data signal between the mobile communication device and the audio conferencing peripheral device, the audio bridging device in communication with the host device, the audio bridging device combines and mixes the audio data signals to create a composite audio data signal using an audio mixing methodology; and
    where the host device executing a unified communications (UC) application that generates a third audio data signal via a virtual audio device, the audio bridging device routes and mixes the third audio data signal with the first and second audio data signal between the mobile communication device, the audio conferencing peripheral device, and the UC application.

6. The claim according to claim 5, where the adaptor is a Bluetooth dongle.

7. The claim according to claim 5, where the adaptor is integrated with the host device.

8. The claim according to claim 5, where the audio bridging device is dynamically operated by a software application in communication with the adaptor and the second USB interface.

9. A method to manufacture a system for USB-to-Bluetooth audio bridging that routes and mixes audio data signals between different devices, comprising:
provide a host device comprising a first universal serial bus (USB) interface and a second USB interface;
coupling an adaptor to the first USB interface, where the adaptor is compatible to operate based on a Bluetooth-type communication protocol;
providing a mobile communication device linked to the host device via the adaptor, the mobile communication device is configured to communicate a first audio data signal to the adaptor over a wireless network;
coupling an audio conferencing peripheral device linked to the host device via the second USB interface, the audio conferencing peripheral device is configured to communicate a second audio data signal;
providing an audio bridging device in communication with the host device, where the audio bridging device is configured to route the first audio data signal and the second audio data signal between the mobile communication device and the audio conferencing peripheral device, the audio bridging device combines and mixes the audio data signals to create a composite audio data signal using an audio mixing methodology; and
where the host device executing a unified communications (UC) application that generates a third audio data signal via a virtual audio device, the audio bridging device routes and mixes the third audio data signal with the first and second audio data signal between the mobile communication device, the audio conferencing peripheral device, and the UC application.

10. The claim according to claim 9, where the adaptor is a Bluetooth dongle.

11. The claim according to claim 9, where the adaptor is integrated with the host device.

12. The claim according to claim 9, where the audio bridging device is dynamically operated by a software application in communication with the adaptor and the second USB interface.

13. A non-transitory program storage device readable by a computing device that tangibly embodies a program of instructions executable by the computing device to perform a method to use a system for USB-to-Bluetooth audio bridging that routes and mixes audio data signals between different devices, comprising:
providing a host device executing a first software application, the host device comprising a first universal serial bus (USB) interface and a second USB interface;
providing an adaptor to the first USB interface, where the adaptor is compatible to operate based on a Bluetooth-type communication protocol;
linking a mobile communication device to the host device via the adaptor, the mobile communication device is configured to communicate a first audio data signal to the adaptor over a wireless network;
linking an audio conferencing peripheral device to the host device via the second USB interface, the audio conferencing peripheral device is configured to communicate a second audio data signal;
configuring audio bridging device to route the first audio data signal and the second audio data signal between the mobile communication device and the audio conferencing peripheral device, the audio bridging device in communication with the host device, the audio bridging device combines and mixes the audio data signals to create a composite audio data signal using an audio mixing methodology; and
where the host device executing a unified communications (UC) application that generates a third audio data signal via a virtual audio device, the audio bridging device routes and mixes the third audio data signal with the first and second audio data signal between the mobile communication device, the audio conferencing peripheral device, and the UC application.

14. The claim according to claim 13, where the adaptor is a Bluetooth dongle.

15. The claim according to claim 13, where the adaptor is integrated with the host device.

16. The claim according to claim 13, where the audio bridging device is dynamically operated by a software application in communication with the adaptor and the second USB interface.

17. The claim according to claim 1 where the audio bridging device is preconfigured before operated.

18. The claim according to claim 5 where the audio bridging device is preconfigured before operated.

19. The claim according to claim 9 where the audio bridging device is preconfigured before operated.

20. The claim according to claim 13 where the audio bridging device is preconfigured before operated.

* * * * *

UNITED STATES PATENT AND TRADEMARK OFFICE
CERTIFICATE OF CORRECTION

PATENT NO. : 9,921,798 B2  
APPLICATION NO. : 14/561700  
DATED : March 20, 2018  
INVENTOR(S) : Peter H. Manley et al.

Page 1 of 1

It is certified that error appears in the above-identified patent and that said Letters Patent is hereby corrected as shown below:

On the Title Page

Item (73), in Column 1, in "Assignee", Line 1, should read -- CLearOne, --, therefor.

In the Claims

In Column 12, Line 29, in Claim 4, delete "wherein" and insert -- where --, therefor.

Signed and Sealed this  
Eighth Day of May, 2018

Andrei Iancu  
*Director of the United States Patent and Trademark Office*